(12) United States Patent
Dage et al.

(10) Patent No.: US 6,464,027 B1
(45) Date of Patent: Oct. 15, 2002

(54) METHOD OF THERMAL MANAGEMENT FOR A HYBRID VEHICLE

(75) Inventors: Gerhard Allen Dage, Franklin; Lawrence William Smith, Riverview, both of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/496,509

(22) Filed: Feb. 2, 2000

(51) Int. Cl.[7] .......................... B60L 11/02; B60K 6/02; B60K 11/02
(52) U.S. Cl. ............... 180/65.2; 180/65.4; 237/12.3 B; 237/75; 237/2 A; 219/208; 123/41.14; 165/202; 165/10; 165/41; 165/51
(58) Field of Search ............................... 165/202, 10 A, 165/41, 51; 123/41.14; 219/208; 237/12.3 B, 2 A, 75; 180/65.4, 65.2

(56) References Cited

U.S. PATENT DOCUMENTS

| | | | |
|---|---|---|---|
| 4,858,565 A | * | 8/1989 | King ........................ 123/41.31 |
| 5,275,012 A | * | 1/1994 | Dage et al. .................. 237/2 A |
| 5,291,960 A | * | 3/1994 | Brandenburg et al. ........ 237/2 B |
| 5,497,941 A | * | 3/1996 | Numazawa et al. ......... 237/2 A |
| 5,531,285 A | * | 7/1996 | Green ......................... 180/65.2 |
| 5,647,534 A | * | 7/1997 | Kelz et al. ............. 237/12.3 B |
| 5,678,760 A | * | 10/1997 | Muso et al. ........... 237/12.3 B |
| 5,752,566 A | | 5/1998 | Liu et al. |
| 5,845,731 A | | 12/1998 | Buglione et al. |
| 5,937,664 A | * | 8/1999 | Maksuno .................... 62/259.2 |

FOREIGN PATENT DOCUMENTS

JP 0235215 * 10/1986 ............ 237/12.3 B

OTHER PUBLICATIONS

SAE Recommended Practice, "Passenger Car Glazing Shade Bands—SAE J100", Mar. 1988.

* cited by examiner

Primary Examiner—John K. Ford
(74) Attorney, Agent, or Firm—Larry I. Shelton

(57) ABSTRACT

A method of thermal management for a thermal management system in a vehicle includes the steps of selecting a thermal management function. The method also includes the steps of adjusting a temperature within the thermal management system using the thermal management function and using the adjusted temperature within the thermal management system to control a temperature within an occupant compartment of the vehicle.

20 Claims, 9 Drawing Sheets

METHOD OF THERMAL MANAGEMENT FOR A HYBRID VEHICLE

BACKGROUND OF THE INVENTION

1. Field of the Invention

The present invention relates generally to thermal management in a vehicle and, more specifically, to a method of thermal management for a hybrid vehicle.

2. Description of the Related Art

Vehicles, and in particular automotive vehicles have traditionally been powered by a heat engine using a petroleum-based fuel, because of its ready availability and relative cost. Although gasoline is currently the fuel of choice for most automotive vehicles, recent environmental concerns have resulted in increasingly more stringent Federal and State emission regulations. As a result, alternative fuel sources have been contemplated for automotive vehicles. For example, methanol, ethanol, natural gas, electricity or a combination of these fuels have been considered as potential fuel sources.

A hybrid vehicle, as is known in the art, is powered by a renewable and a non-renewable energy source. The hybrid vehicle overcomes the technical disadvantages of a dedicated electric vehicle by utilizing each type of power source. However, the fuel efficiency of either a hybrid or electric-powered vehicle reduces the amount of waste heat available for use by a thermal management system. The thermal management system provides powertrain cooling to maintain the temperature within an underhood compartment of the vehicle. The thermal management system also provides climate control to maintain the temperature of an occupant compartment of the vehicle at a comfortable level by providing both heating, cooling and ventilation. The thermal management system manages the interrelated challenges of removing waste heat rejected by various vehicle systems such as the engine or battery, and providing heating or cooling for the occupant compartment. Thus, there is a need in the art for a method of thermal management for a thermal management system in a hybrid vehicle that controls a supplemental heating device, provides powertrain and battery cooling, power management, and maintains occupant comfort.

SUMMARY OF THE INVENTION

Accordingly, the present invention is a method of thermal management for a thermal management system in a vehicle. The method includes the steps of selecting a thermal management function. The method also includes the steps of adjusting a temperature within the thermal management system using the thermal management function and using the adjusted temperature within the thermal management system to control a temperature within an occupant compartment of the vehicle.

One advantage of the present invention is that a method of thermal management for a thermal management system in a hybrid vehicle is provided that removes heat rejected by various vehicle systems, controls the occupant compartment climate, and cools the powertrain and battery. Another advantage of the present invention is that the method of thermal management for a thermal management system in the hybrid vehicle provides control of a supplemental heat source, such that minimal energy is expended in maintaining a predetermined temperature in the underhood and occupant compartments. A further advantage of the present invention is that a method of thermal management for a thermal management system in the hybrid vehicle is provided that considers both external vehicle and interior vehicle thermal management criteria.

Other features and advantages of the present invention will be readily appreciated, as the same becomes better understood after reading the subsequent description taken in conjunction with the accompanying drawings.

DESCRIPTION OF THE PREFERRED EMBODIMENT(S)

Figure 1:
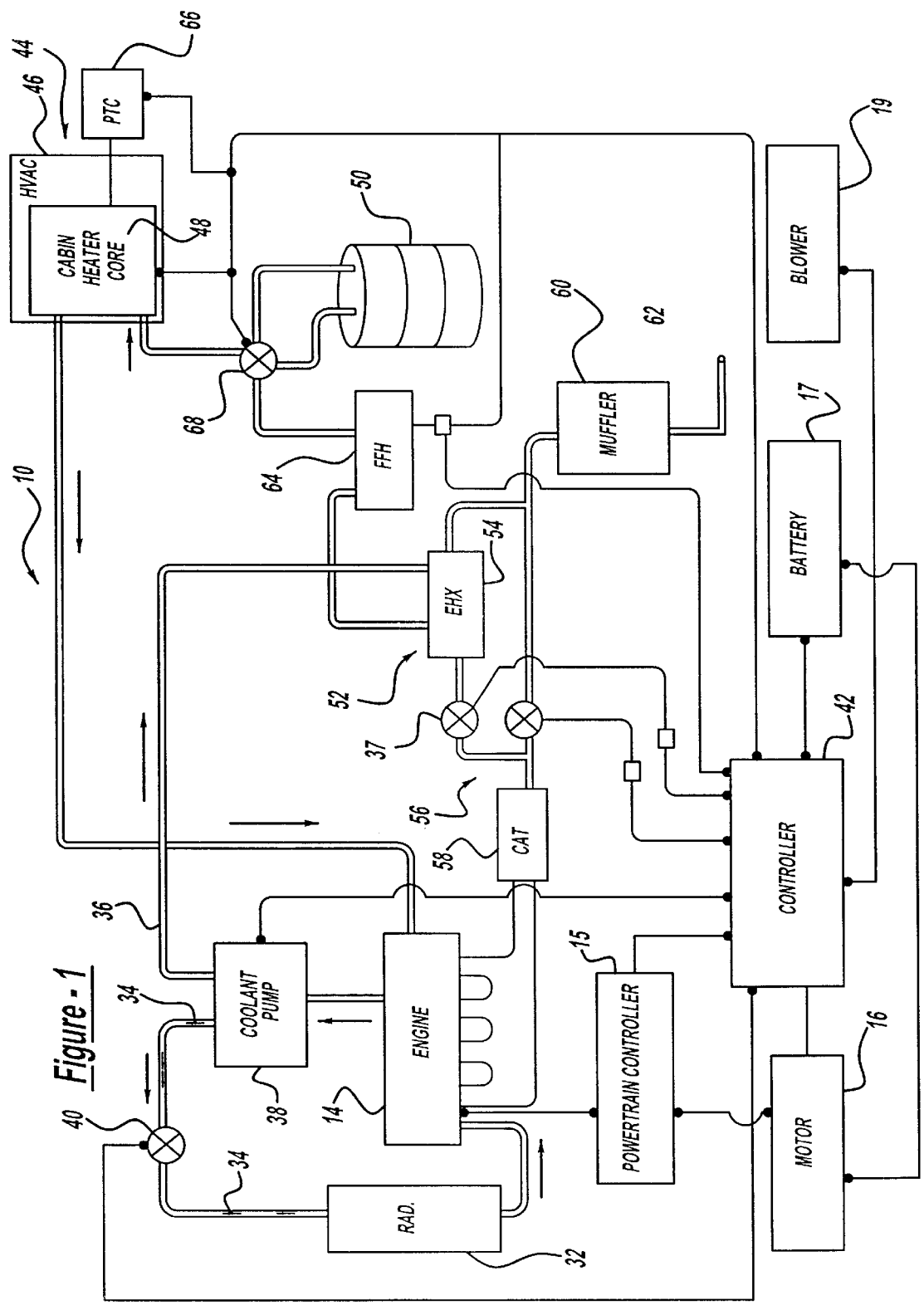
FIG. 1 is a block diagram of a thermal management system which may be utilized with a method of thermal management for the thermal management system in a hybrid vehicle, according to the present invention.
Figure 2:
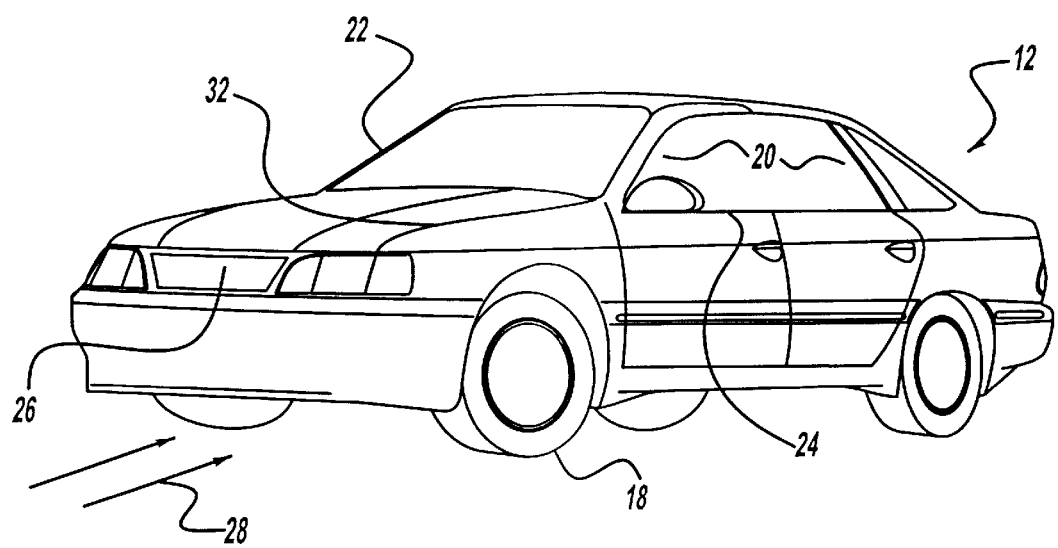
FIG. 2 is a perspective view of a hybrid vehicle, according to the present invention, for the thermal management system of FIG. 2.

Referring to FIGS. 1 and 2, one embodiment of a thermal management system 10 on a hybrid vehicle 12 is illustrated. Preferably, the hybrid vehicle 12 includes a heat engine 14 operating on a hydrocarbon-based or fossil fuel and an electric machine 16, although other vehicle types are contemplated. In this example, the electric machine 16 is an induction motor or permanent magnet motor capable of providing both positive and regenerative torque, by functioning both as a motor and an alternator. Electric power to operate the electric machine is stored in an electric power storage battery 17. The engine 14 is operatively connected to a transmission (not shown), as is known in the art, to transmit engine rotation and power to a drive wheel 18. Thus, the transmission enables the hybrid vehicle 12 to accelerate over its speed range through predetermined gear ratios, while the engine 14 functions within a predetermined operating range. It should be appreciated that the engine 14 and motor 16 are in communication with a powertrain controller 15 that manages and controls their operation. The powertrain controller 15 is also in communication with the thermal management system 10.

The thermal management system 10 generally provides both exterior thermal management and interior thermal management. Exterior thermal management provides powertrain cooling within the hybrid vehicle 12. Interior thermal management provides for heating, ventilation and air conditioning of an occupant compartment 20 portion of the hybrid vehicle 12, and is referred to as climate control. Advantageously, interior thermal management provides for a comfortable interior temperature of the occupant compartment 20, and good visibility through a windshield 22 and other windows 24 of the hybrid vehicle 12. It should be appreciated that the interior temperature of the hybrid vehicle 12 may be affected by factors such as occupant compartment temperature, ambient temperature, external air flow and heat radiation.

The thermal management system 10 includes a fan (not shown) positioned behind a front grill 26 portion of the hybrid vehicle 12. The fan draws air 28 from outside the hybrid vehicle 12 into the underhood compartment 30 to provide cooling of powertrain components, such as the engine 14 or the motor 16. The thermal management system 10 also includes a blower 19 that circulates air to cool the electric power storage battery 17. The thermal management system 10 includes a radiator 32 positioned behind the front grill 26. The radiator 32 provides powertrain cooling by the rejection of waste heat from the engine 14 through a coolant fluid 34. For example, the coolant fluid 34 is a mixture of antifreeze and water.

The thermal management system also includes a coolant pump 38, as is known in the art, to distribute the coolant fluid 34 throughout the thermal management system 10 throughout a series of ducts 36. The control of the coolant fluid 34 through the ducts 36 is by a valve 37 disposed therein.

The thermal management system 10 includes a temperature sensor 40, such as an electric thermostat, to regulate the temperature of the coolant fluid 34. For example, if the temperature of the coolant fluid 34 is lower than a predetermined level, the temperature sensor 40 sends a signal to a controller 42, which directs the valve 37 operatively connected to the coolant pump 38 to increase the amount of coolant fluid 34, which bypasses the radiator 32.

The thermal management system 10 also includes an air-flow handling system, referred to in the art as a heating, ventilation and air conditioning (HVAC) air-handling assembly 44, for providing climate control of the occupant compartment. The HVAC air-handling assembly 44 conditions a flow of air by heating or cooling the airflow and distributing the flow of conditioned air to the interior of the occupant compartment 20 of the vehicle 12. It should be appreciated that, in this embodiment, the HVAC air-handling assembly 44 is positioned on the occupant compartment 20 side of a dash panel (not shown), below an instrument panel (not shown). Also, in this embodiment, the HVAC air handling assembly 44 includes a case 46, having a preferred architecture, to package the individual component parts of the HVAC air-handling assembly 44.

For example, the HVAC air-handling assembly 44 houses a heater core 48 that heats a flow of air to be conditioned by the thermodynamic transfer of heat from the coolant fluid 34. The heated air is distributed to the occupant compartment 20 via a series of air flow ducts (not shown), as is known in the art.

The thermal management system 10 also includes a supplemental heat recovery source, such as a heat storage battery 50, as is known in the art. The heat storage battery 50 is an insulated vessel for storing the coolant fluid 34. Preferably, the heat storage battery 50 is positioned near the heater core 48 in the HVAC air-handling assembly 44. The heat storage battery 50 receives the coolant fluid 34 from a heat generating source and stores it until it is needed within the thermal management system 10. For example, the coolant fluid 34 may be distributed to the heater core 48 within the HVAC air-handling assembly 44. Advantageously, the use of the heated coolant fluid 34 provides for increased output of the HVAC air-handling assembly 44 resulting in quicker warm up of the occupant compartment 20.

Another example of a supplemental heat recovery source to heat the coolant fluid 34 is an exhaust heat recovery system 52. The exhaust heat recovery system utilizes the waste heat in the exhaust gas from the engine 14 to heat the coolant fluid 34. The exhaust heat recovery system 52 is positioned in the exhaust system 56, typically after the catalyst 58. In this example, the exhaust heat recovery system 52 includes a heat exchanger (EHX) 54. The coolant fluid 34 is pumped through the heat exchanger 54 by the coolant pump 38, and the heat from the exhaust gas heats the coolant fluid 34 using convective and conductive heat transfer. Preferably, the exhaust system 56 splits after the catalyst 58, as is known in the art, allowing the exhaust gas to go either through the heat exchanger 54, or by-pass the heat exchanger 54, as controlled by valves 37. The heated coolant fluid 34 is then available for use within the thermal management system 10, such as by the heater core 48 or heat storage battery 50. The exhaust gas flows out of the exhaust system 56, via a muffler 60 and a tailpipe 62, and into the outside air, as is known in the art.

The thermal management system includes a supplemental heat generating source such as a fuel-fired heater 64 that provides supplemental heat to raise the temperature of the coolant fluid 34. The fuel-fired heater 64, as is known in the art, contains a burner that burns a fuel from an available source, such as a fuel tank (not shown), to heat the coolant fluid 34. The fuel-fired heater 64 receives the coolant fluid 34 from a source such as the engine 14. It should be appreciated that the coolant fluid 34 may come from the exhaust heat recovery system 52. Preferably, the fuel-fired heater 64 is positioned near the heater core 48. The heated coolant fluid 34 from the fuel fired heater 64 is available for use elsewhere in the thermal management system 10, such as by the heater core 48 in the HVAC air-handling system 44, or for storage in the heat storage battery 50. It should be appreciated that a valve 68, such as a 4-way valve, in communication with the controller 42, directs the flow of coolant fluid from the supplemental heat sources.

A further supplemental heat generating source is a grid type resistive heater. An example of a grid type heater is a positive temperature coefficient heater (PTC) 66 that heats the air exiting the HVAC air-handling assembly 44.

The thermal management system 10 further includes a control mechanism 42, such as an engine controller, that is in communication with the thermal management system 10. The control mechanism 42 manages and controls the operation of the thermal management system 10 in a manner to be described.

Preferably, the thermal management system 10 includes other component parts, such as actuators (not shown) and switches (not shown), which are conventional and well known in the art to operatively maintain the thermal environment of the hybrid vehicle 10.

Referring to FIGS. 3A through 3H, a flowchart of a method, according to the present invention, of thermal management for the thermal management system 10 in the hybrid vehicle 12 is illustrated. The method provides for the comprehensive design of the thermal management system 10 for the hybrid vehicle 12 with a hybrid powertrain, with occupant compartment 20 heating as a primary performance criteria. It should be appreciated that, the method is also applicable to a gasoline powered vehicle.

Figure 3A:
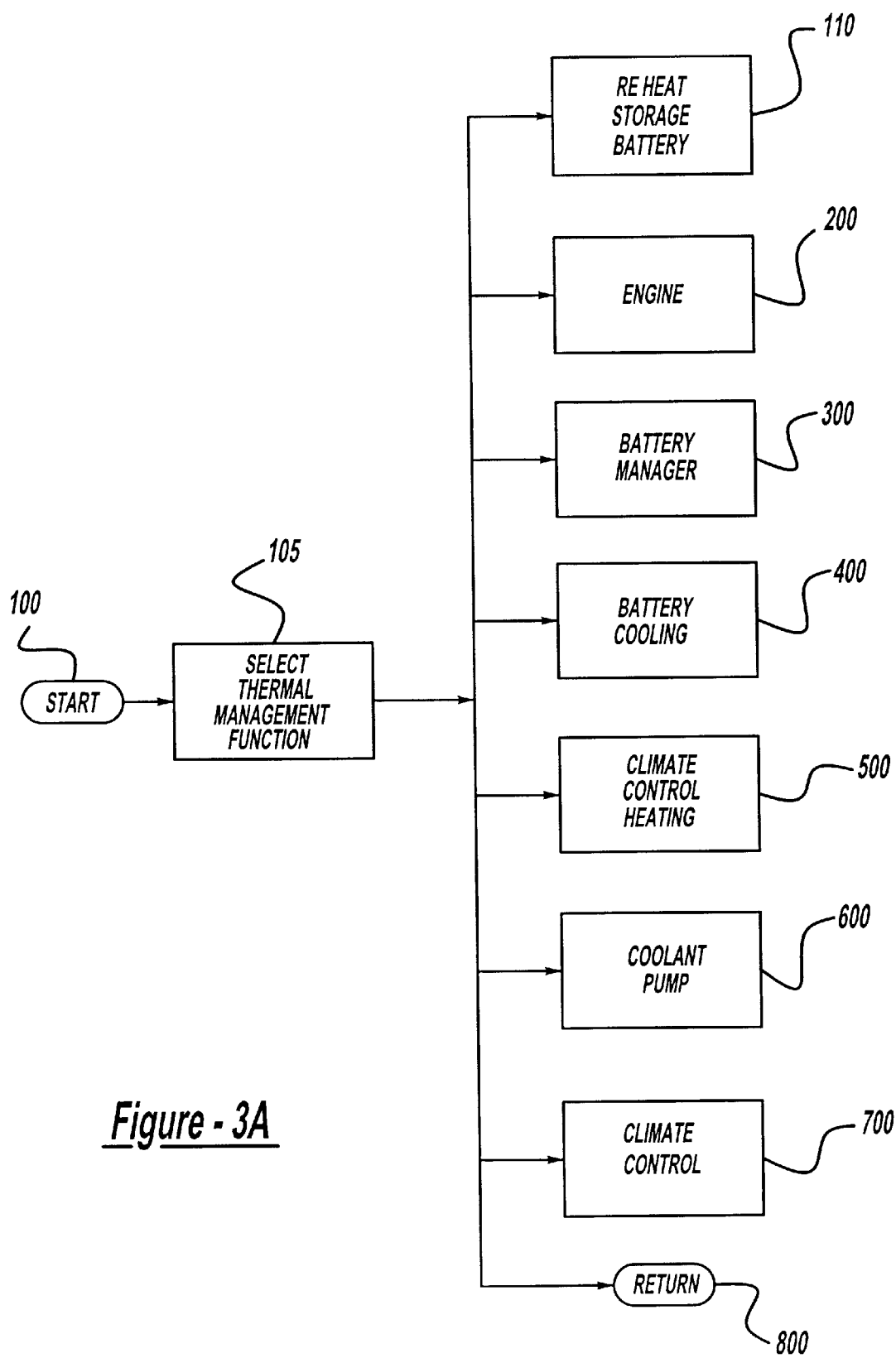
FIGS. 3A through 3H is a flowchart of a method, according to the present invention, of FIGS. 1 and 2 of thermal management for the thermal management system in the hybrid vehicle.
Figure 3B:
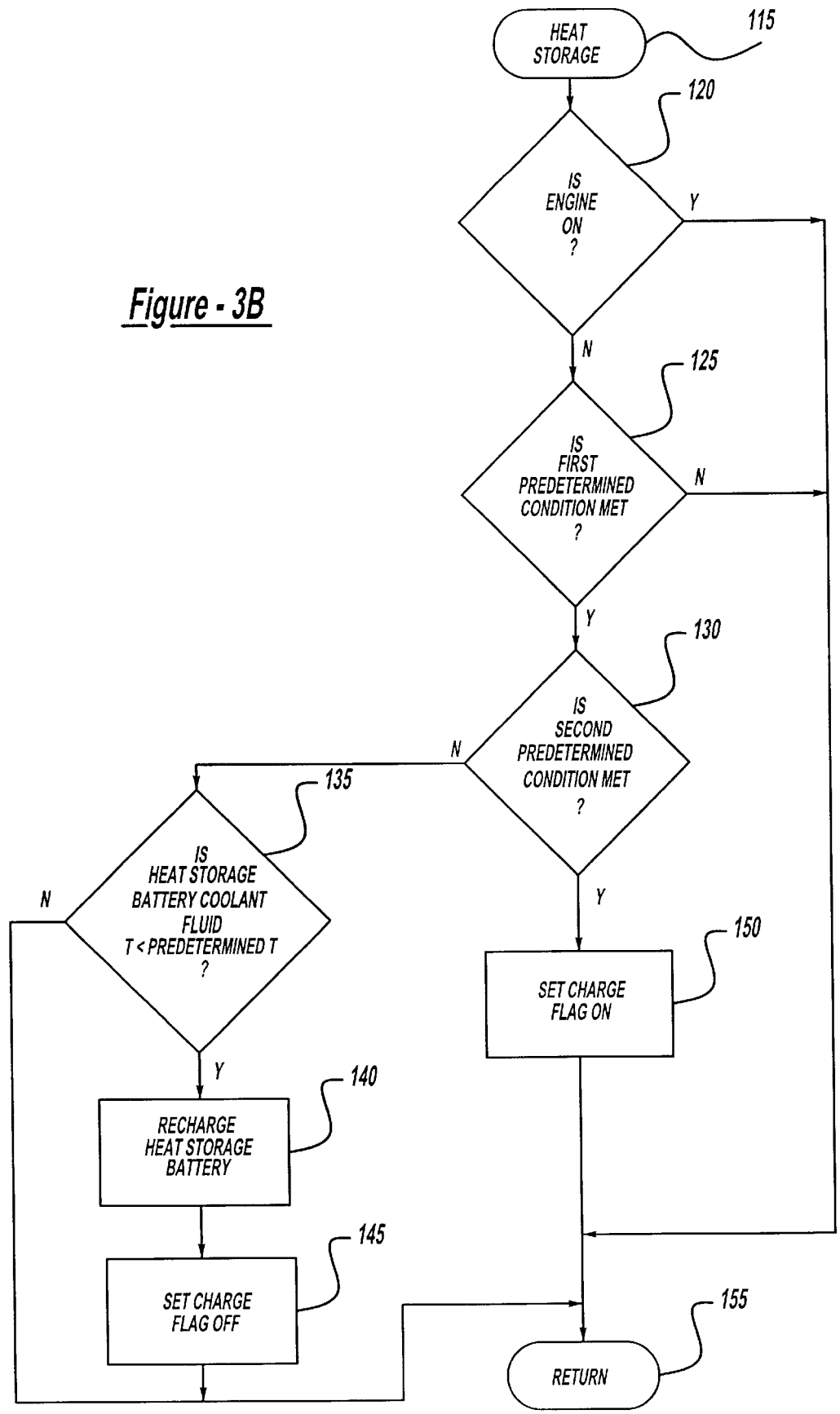
Figure 3C:
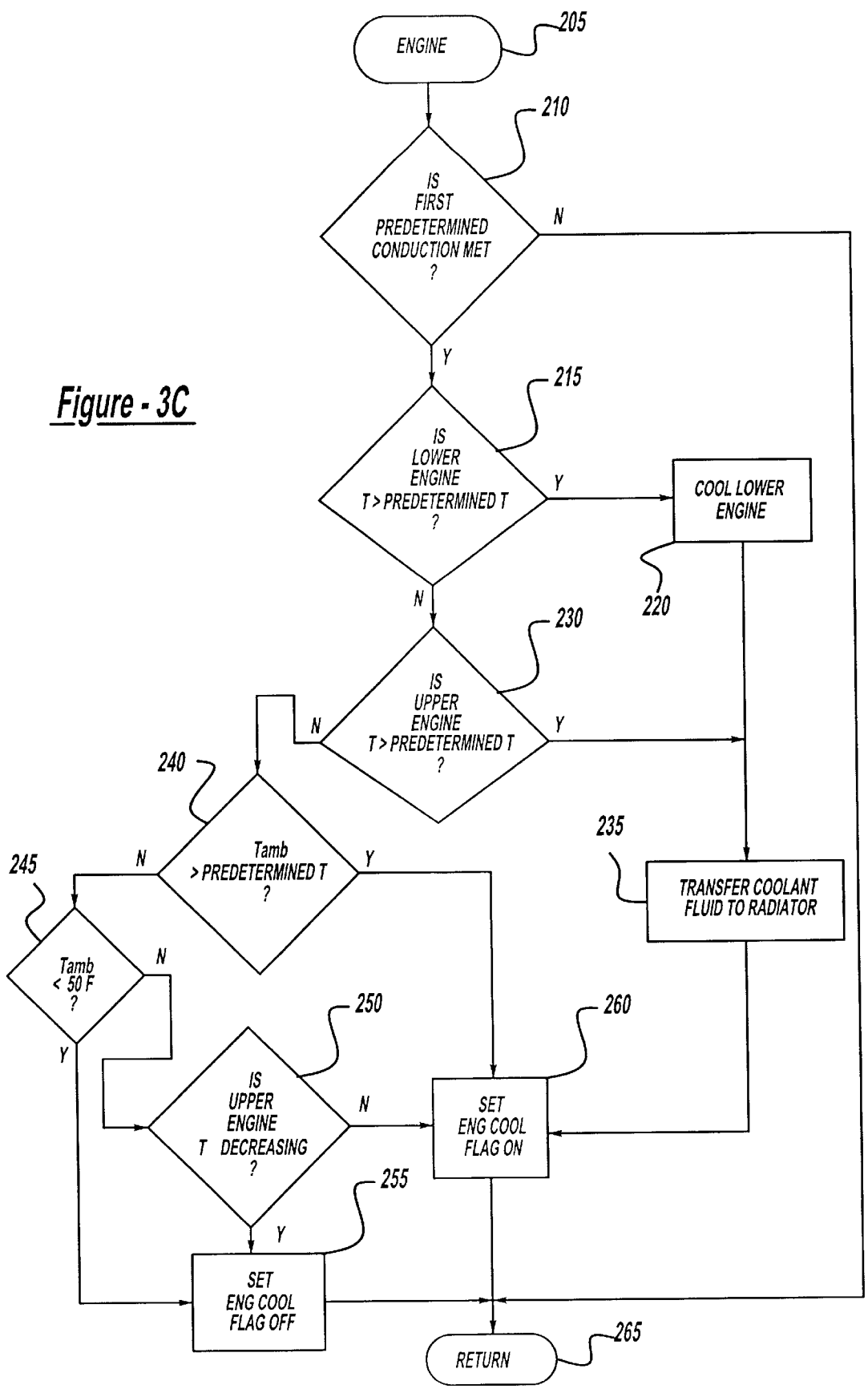
Figure 3D:
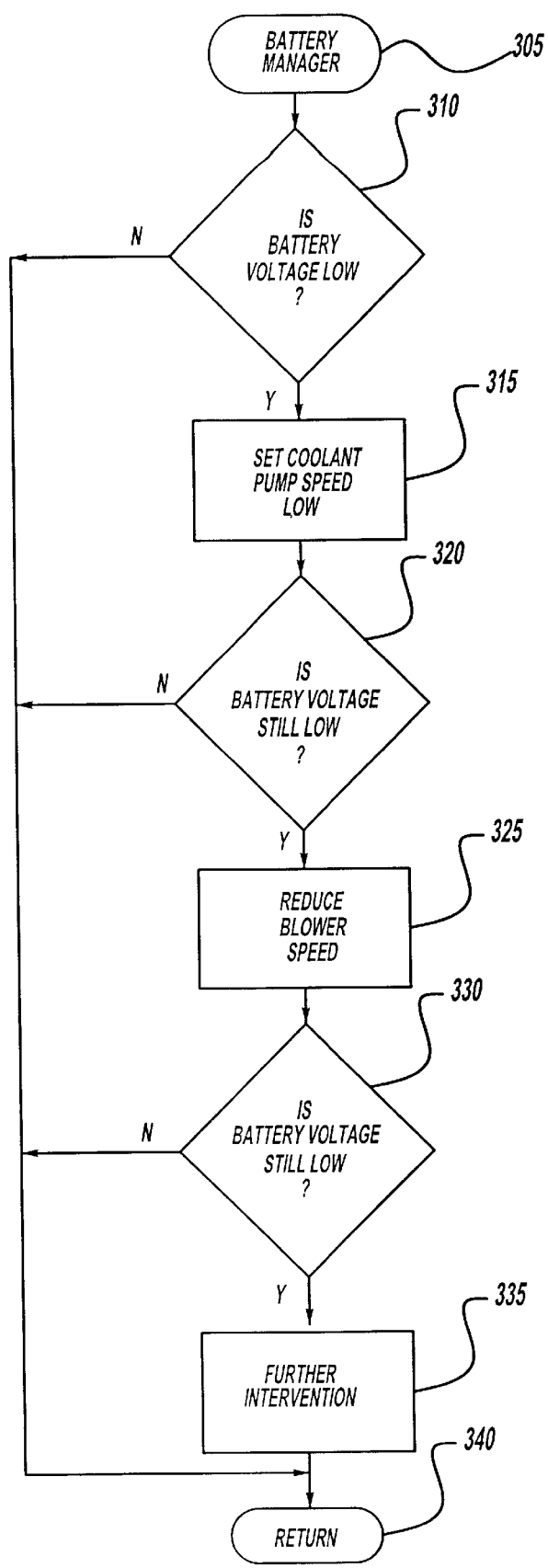
Figure 3E:
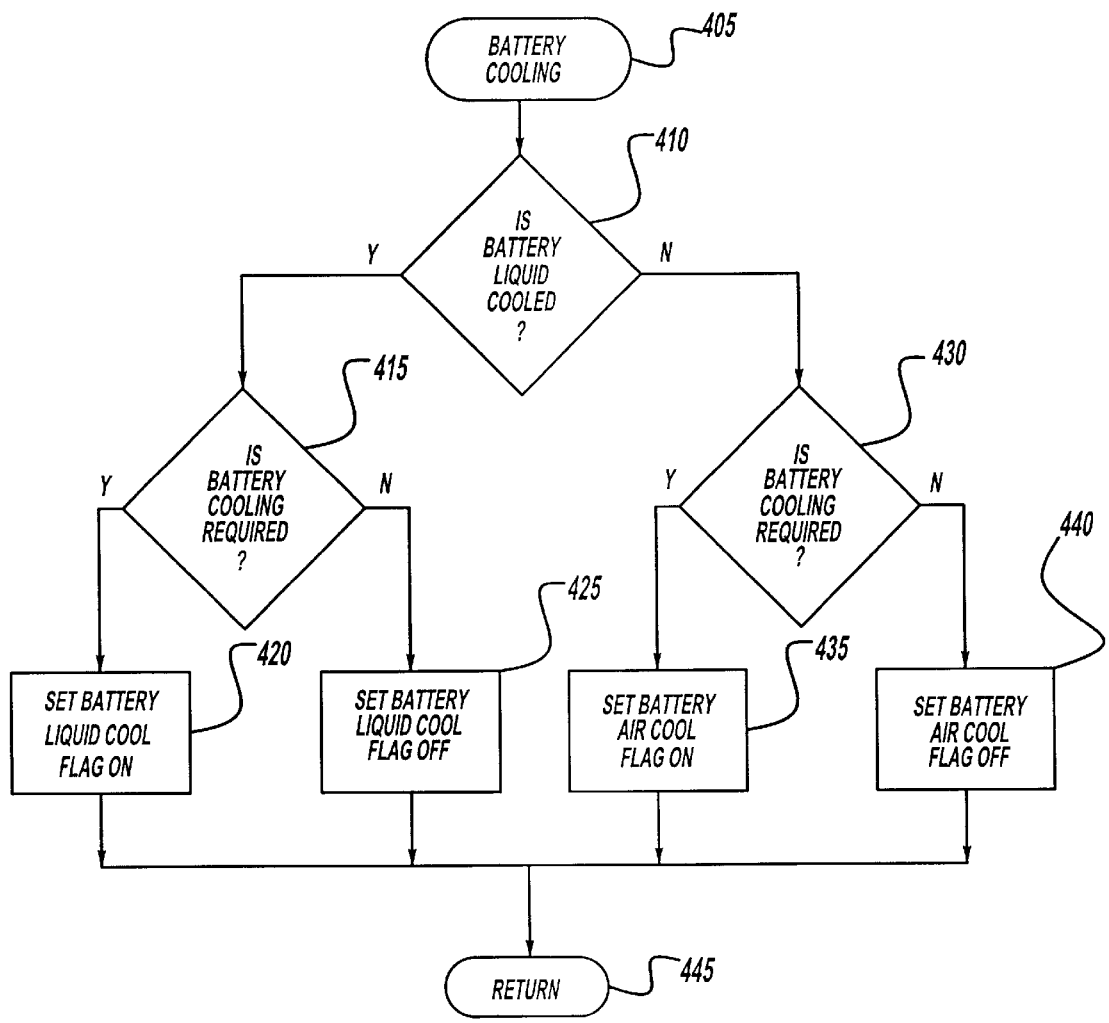
Figure 3F:
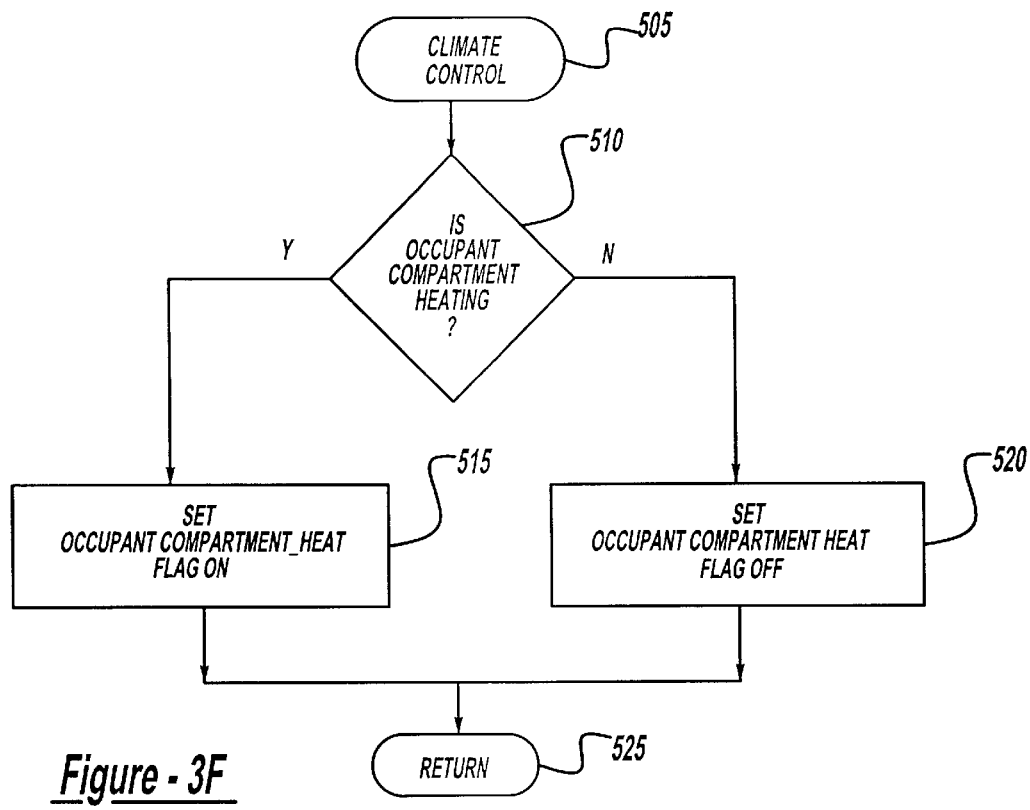
Figure 3G:
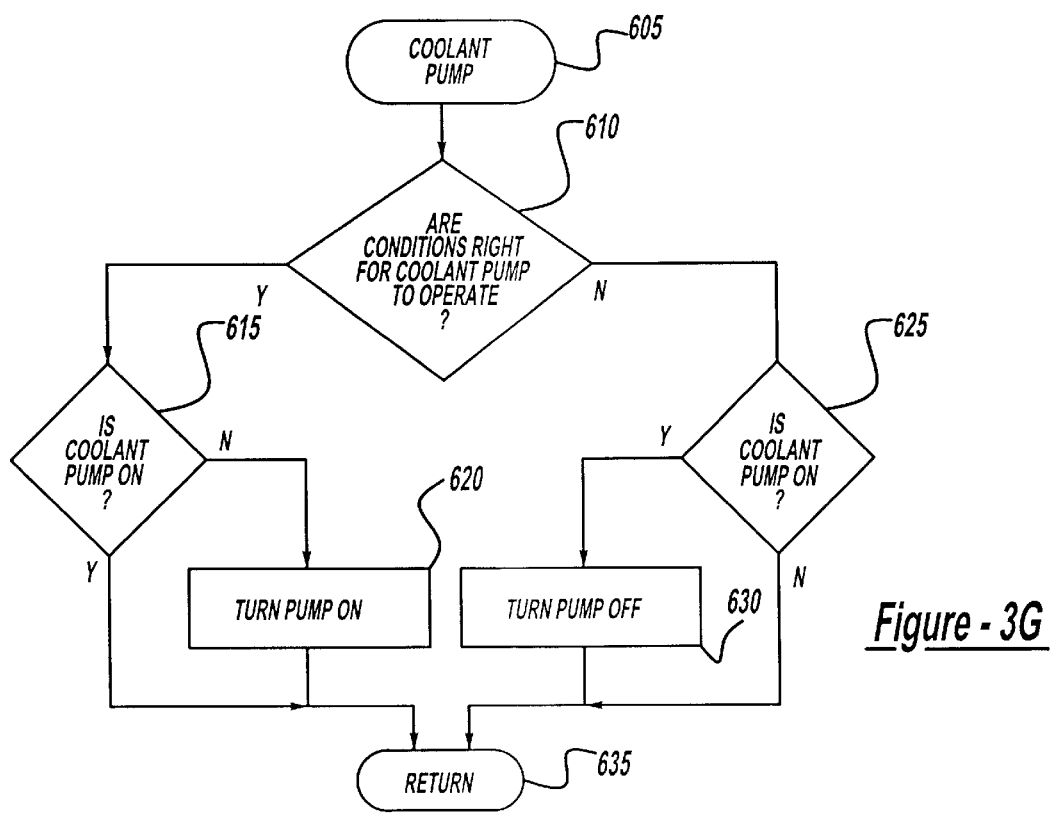

Referring to FIG. 3A, the methodology begins in block 100 and continues to block 105. In block 105, the methodology selects a thermal management function to perform, preferably in the order indicated. However, those skilled in the art will recognize that the foregoing list is illustrative only, and not exhaustive. If a recharge heat storage battery thermal management function is selected, the methodology advances to block 110. In block 110, the methodology advances to bubble 115 in FIG. 3B, and advances to diamond 120. In diamond 120, the methodology determines if the engine 14 is turned on, such as by checking the powertrain controller 15. If the engine 14 is turned on, the methodology advances to bubble 155 and returns to block 105 of FIG. 3A.

Returning to diamond 120, if the engine 14 is not turned on, the methodology advances to diamond 125 and determines if a first predetermined condition is met to recharge the heat storage battery 50. An example of a first predetermined condition is if a flag is set indicating that the engine 14 is operating. If the first predetermined condition is not met, the methodology advances to bubble 155 and returns to block 105 in FIG. 3A.

Returning to diamond 125, if the first predetermined condition is met, the methodology advances to diamond 130 and determines if a second predetermined condition is met to recharge the heat storage battery 50. An example of a second predetermined condition is if the climate control system is operational, such as may occur if the vehicle ignition is keyed to an "accessory on" position, whereby the engine 14 is not operational but the climate control system is operational. If the second predetermined condition is not met, conditions are right to recharge the heat storage battery 50 and the methodology advances to diamond 135. In diamond 135, the methodology determines if a temperature of the coolant fluid 34 stored in the heat storage battery 50 is less than a predetermined temperature. For example, the predetermined temperature may be an engine head temperature, as is known in the art. If the coolant fluid temperature within the heat storage battery 50 is not less than the predetermined temperature, the methodology advances to bubble 155 and returns to block 105 in FIG. 3A.

Returning to diamond 135, if the coolant fluid temperature within the heat storage battery 50 is less than the predetermined temperature, then the heat storage battery 50 should be recharged. The methodology advances to block 140. In block 140, the heat storage battery 50 is recharged. For example, a valve 68 operatively connected to the heat storage battery 50 is opened to allow the flow of heated coolant fluid 34 from a source, such as the engine 14, into the heat storage battery 50. The methodology advances to block 145. In block 145, a flag is set indicating that the heat storage battery has been recharged. The methodology advances to bubble 155 and returns to block 105 shown in FIG. 3A.

Returning to diamond 130, if the second predetermined condition is met, the heat storage battery 50 should not be recharged right now and the methodology advances to block 150. In block 150, a flag is set indicating the heat storage battery 50 should be recharged at a later time. The methodology advances to bubble 155 and returns to block 105 shown in FIG. 3A.

Returning to block 105 in FIG. 3A, if an engine cooling thermal management function is selected, the methodology advances to block 200. In block 200, the methodology advances to bubble 205 shown in FIG. 3C and continues. Advantageously, the engine cooling thermal management function provides for cooling of the engine 14. In this example, the engine 14 is split cooled, as is known in the art, in recognition of the different temperature in the upper portion and lower portion of the engine 14. The methodology advances to diamond 210 and determines if a first predetermined condition is met to provide engine cooling. An example of a first predetermined condition is if the vehicle ignition is keyed "on". Another example of a first predetermined condition is if the engine is operating. If the first predetermined condition is not met, the methodology advances to bubble 265 and returns to block 105 in FIG. 2A.

Returning to diamond 210, if the first predetermined condition is met, the methodology advances to diamond 215. In diamond 215, the methodology determines if a temperature in a lower portion of the engine 14, such as a crankcase, is greater than a predetermined temperature, such as one hundred eighty degrees Fahrenheit (180° F.) . If the temperature in the lower portion of the engine 14 is greater than a predetermined temperature, the lower portion of the engine 14 should be cooled and the methodology advances to block 220. In block 220, the methodology cools the lower portion of the engine 14, such as by opening a valve 37 operatively connected to the crankcase, as is known in the art, to distribute coolant fluid 34 through the lower portion of the engine 14. The methodology advances to block 235, to be described.

Returning to diamond 215, if the lower engine temperature is less than a predetermined temperature, the methodology advances to diamond 230. In diamond 230, the methodology determines if a temperature of an upper portion of the engine 14, such as the head temperature, is greater than a predetermined temperature. An example of a predetermined temperature is one hundred eighty degrees Fahrenheit (180° F.). If the temperature of the upper portion of the engine 14 is greater than the predetermined temperature, the methodology advances to block 235. In block 235, the coolant fluid 34 is transferred to the radiator 32 to accomplish heat rejection in the upper portion of the engine 14. The methodology advances to block 260, to be described.

Returning to diamond 230, if the upper engine temperature is less than a predetermined temperature, the methodology advances to diamond 240. In diamond 240, the methodology determines if the coolant pump 38 should operate based on the ambient temperature by determining if an ambient temperature is greater than a predetermined first ambient temperature. An example of a predetermined first ambient temperature is fifty-five degrees Fahrenheit (55 F.). If the ambient temperature is less than the predetermined first ambient temperature, the methodology advances to diamond 245. In diamond 245, the methodology determines if the ambient temperature is less then a predetermined second ambient temperature. If the ambient temperature is less than the second ambient temperature, the methodology advances to block 255 and sets an engine cooling flag to an "off" position, and continues to block 265, to be described.

Returning to diamond 245, if the ambient temperature is not less than the second ambient temperature, the methodology advances to diamond 250. In diamond 250, the methodology determines if the upper engine temperature is decreasing, such as by determining if the engine head temperature is decreasing. If the upper engine temperature is decreasing, the methodology advances to block 255, previously described and continues. If the upper engine temperature is not decreasing, the methodology advances to block 260.

In block 260, an engine cooling flag is set to an "on" position, indicating that the coolant pump 38 should operate to cool the engine 14. The methodology advances to bubble 265 and returns to block 105 in FIG. 3A.

Returning to block 105 in FIG. 3A, if a battery power thermal management function is selected, the methodology advances to block 300. In block 300, the methodology advances to bubble 305 in FIG. 3D and continues to diamond 310. In diamond 310, the methodology determines if a battery voltage within the electric power storage battery 17 is low. For example, by determining if the battery voltage is lower than a first predetermined voltage, such as 12.8 volts. If the battery voltage is not low, the methodology advances to bubble 340 and returns to block 105 in FIG. 3A.

If the battery voltage is lower than the first predetermined voltage, the methodology advances to block 315 and reduces power to a component, such as by lowering the coolant pump speed, to conserve electrical power. The methodology advances to diamond 320 determines if the battery voltage is still low, such as by determining if the battery voltage is lower than a second predetermined voltage, such as 11.0 volts. If the battery voltage is not lower than the second predetermined voltage, the methodology advances to bubble 340 and returns to block 105 in FIG. 3A.

If the battery voltage is lower than the second predetermined voltage, the methodology advances to block 325 and reduces power to another component, such as by lowering the blower speed, to conserve electrical power. The methodology advances to diamond 330 and determines if a battery voltage is still low, such as by determining if the battery voltage is lower than a third predetermined voltage, such as 9.5 volts. If the battery voltage is not low, the methodology advances to bubble 340 and returns to block 105 in FIG. 2A.

Returning to diamond 330, if the battery voltage is lower than the third predetermined voltage, the methodology advances to block 335 and intervenes further to conserve electrical power. For example, the methodology may reduce power to operate an accessory such as by dimming a light (not shown) or reducing power to operate a radio (not shown). Those skilled in the art will recognize that the foregoing list is intended to be illustrative of ways to conserve power only and not exhaustive. The methodology advances to bubble 340, and returns to block 105 in FIG. 3A.

Returning to block 105, if a battery cooling thermal management function is selected, the methodology advances to block 400. In block 400, the methodology advances to bubble 405. In bubble 405, the methodology advances to diamond 410 and determines the type of thermal cooling required by the electric power storage battery 17, such as liquid cooled or air cooled. If the battery 17 is liquid cooled, the methodology advances to diamond 415. In diamond 415, the methodology determines if battery cooling is required. For example, the temperature of the coolant fluid at the battery 17 may be used as a criteria. If battery cooling is required, the methodology advances to block 420 and sets a battery liquid cool flag "on". The methodology advances to bubble 445 and returns to block 105 in FIG. 3A.

Returning to diamond 415, if battery cooling is not required, the methodology advances to block 425 and sets a battery liquid cool flag "off". The methodology advances to bubble 445 and returns to block 105 in FIG. 3A.

Returning to diamond 410, if the battery is air cooled such as by the blower 19, the methodology advances to diamond 430. In diamond 430, the methodology determines if battery cooling is required. For example, the temperature of the air near the battery 14 is measured. If battery cooling is required, the methodology advances to block 435 and sets a battery air cool flag "on". The methodology advances to bubble 445 and returns to block 105 in FIG. 3A. Returning to diamond 430, if battery cooling is not required, the methodology advances to block 440 and sets a battery air cool flag "off". The methodology advances to bubble 445 and returns to block 105 in FIG. 3A.

Returning to block 105, if a climate control heating thermal management function is selected, the methodology advances to block 500. In block 500, the methodology advances to bubble 505 in FIG. 3F and continues to diamond 510. In diamond 510, the methodology determines if heating of the occupant compartment 20 is required. For example, the methodology checks if an automatic temperature control in the climate control system is turned on. If occupant compartment heating is required, the methodology advances to block 515. In block 515, the methodology sets an occupant compartment heat flag to an "on" position. The methodology advances to bubble 525 and returns to block 105 in FIG. 3A.

Returning to diamond 510, if occupant compartment heating is not required, the methodology advances to block 520. In block 520, the methodology sets an occupant compartment heat flag to an "off" position. The methodology advances to bubble 525 and returns to block 105 in FIG. 3A.

Returning to block 105 in FIG. 3A, if a coolant pump thermal management function is selected, the methodology advances to block 600. Advantageously, the coolant pump thermal management function operates the coolant pump 38 to distribute a flow of coolant fluid through the engine 14 for heat discharge purposes. In block 600, the methodology advances to bubble 605 in FIG. 3G. In bubble 605, the methodology advances to diamond 610 and determines if a predetermined condition is right for the coolant pump 38 to operate. An example of a predetermined condition is if a flag is activated, such as an engine cool flag, battery liquid cool flag, occupant compartment heat flag or heat storage battery charge flag. If the coolant pump 38 should operate, the methodology advances to diamond 615 and determines if the coolant pump 38 is already operating. For example, by checking if a flag is set in the controller 42. If the coolant pump 38 is not turned on and operating, the methodology advances to block 620 and turns on the coolant pump 38. The methodology advances to bubble 635 and returns to block 105 in FIG. 3A. Returning to diamond 615, if coolant pump 38 is already on, the methodology advances to bubble 635 and returns to block 105 in FIG. 3A.

Returning to diamond 610, if the coolant pump 38 should not operate, the methodology advances to diamond 625 and determines if the coolant pump 38 is already operating. For example, by checking a flag in the controller 42. If the coolant pump 38 is turned on and operating, the methodology advances to block 630 and turns off the coolant pump 38. The methodology advances to bubble 635 and returns to block 105 in FIG. 3A. Returning to diamond 625, if the coolant pump 38 is not turned on, the methodology advances to bubble 635 and returns to block 105 in FIG. 3A.

Figure 3H:
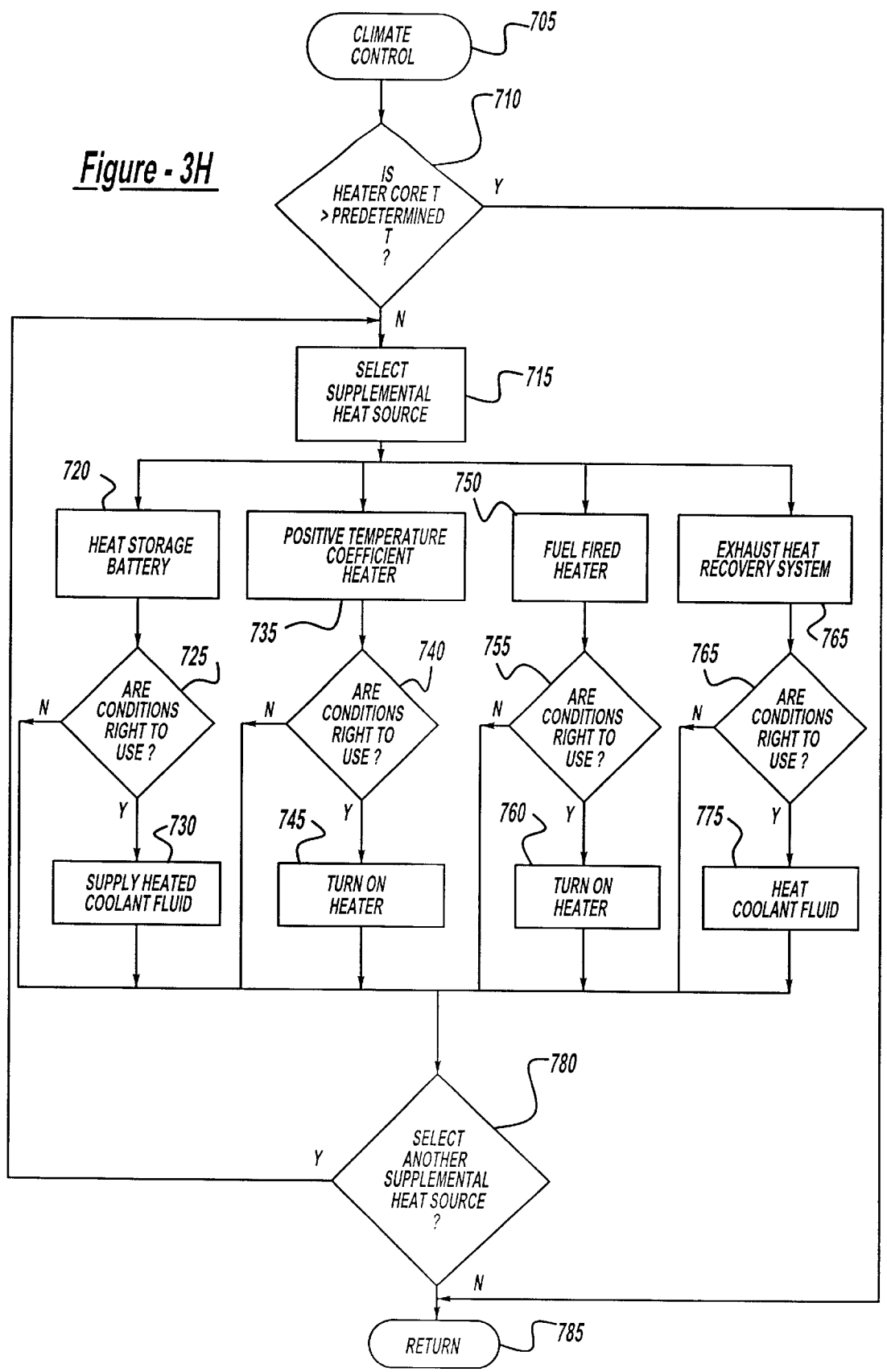

Returning to block 105 in FIG. 3A, if a climate control thermal management function is selected, the methodology advances to block 700 in FIG. 3A and continues to bubble 705 in FIG. 3H. Advantageously, the climate control thermal management function determines if supplemental heat is required to raise the temperature of the coolant fluid 34. A raised coolant fluid temperature within the heater core 48 in the HVAC air-handling assembly 44 improves the output of heated air into the occupant compartment 20 from the HVAC air-handling assembly 44. The heated coolant fluid also benefits the engine 14 during a cold start by enabling the engine 14 to reach its operating temperature at a faster rate. The methodology advances to diamond 710 and determines if a heater core temperature within the HVAC air-handling assembly 44 is greater than a predetermined temperature. An example of a predetermined temperature is one hundred seventy degrees Fahrenheit (170° F.). If the heater core temperature is greater than the predetermined temperature, the methodology advances to bubble 785, to be described.

Returning to diamond 710, if the heater core temperature is not greater than the predetermined temperature, the methodology advances to block 715. In block 715, the methodology selects a supplemental heat source to increase the temperature of the coolant fluid 34 within the heater core 48. One skilled in the art will recognize that the foregoing list is intended to be illustrative only, and not exhaustive. Preferably, the heat storage battery 50, then exhaust heat recovery system 52, then positive temperature coefficient heater 66 and then the fuel fired heater 64 is selected. For example, if the heat storage battery 50 is selected as a supplemental heat source, the methodology advances to block 720.

In block 720, the methodology advances to diamond 725 and determines if a predetermined condition is right to use the heated coolant fluid 34 from the heat storage battery 50 as a supplemental heat source. An example of a predetermined condition is if an occupant compartment heat flag is set "on". Another example of a predetermined condition is if a heat storage battery coolant fluid temperature is greater than the temperature of the coolant fluid 34 in the heater core 48. If the predetermined condition is satisfied, the methodology advances to block 730 and opens a valve 68 operatively connected to the heat storage battery 50 to supply heated coolant fluid 34 to the heater core 48. The methodology advances to diamond 780, to be described. Returning to diamond 725, if the predetermined condition is not satisfied to supply heated coolant fluid 34 from the heat storage battery 50, the methodology advances to diamond 780, to be described.

Returning to block 715, if a positive temperature coefficient heater 66 is selected as a supplemental heat source, the methodology advances to block 735. In block 735, the methodology advances to diamond 740 and determines if a predetermined condition is right to heat air exiting the HVAC air-handling assembly 44 using the positive temperature coefficient heater 66 as a supplemental heat generating source 52. An example of a predetermined condition is if an occupant compartment heat flag is set "on". If the predetermined condition is satisfied, the methodology advances to block 740 and activates the positive temperature coefficient heater 66 to heat the air exiting the HVAC air-handling assembly 44. The methodology advances to diamond 780, to be described. Returning to diamond 740, if the predetermined condition is not satisfied to use the positive temperature coefficient heater 66, the methodology advances to diamond 780, to be described.

Returning to block 715, if a fuel fired heater 64 is selected as a supplemental heat source, the methodology advances to block 750. In block 750, the methodology advances to diamond 755 and determines if a predetermined condition is right to heat the coolant fluid 34 using the fuel fired heater 64 as a supplemental heat source. An example of a predetermined condition is if an exhaust gas temperature is greater than a predetermined temperature, so that the exhaust heat recovery system 54 can be used. Another example of a predetermined condition is if the fuel fired heater 64 is already operational. If the predetermined condition is satisfied, the methodology advances to block 760 and operates the fuel fired heater 64 to heat the coolant fluid 34. The methodology advances to diamond 780, to be described. Returning to diamond 755, if the predetermined condition is not satisfied to heat the coolant fluid 34 using the fuel fired heater 64, the methodology advances to diamond 780, to be described.

Returning to block 715, if an exhaust heat recovery system 54 is selected as a supplemental heat source, the methodology advances to block 765. In block 765, the methodology advances to diamond 770 and determines if a predetermined condition is right to use the heated coolant fluid 34 from the exhaust heat recovery system 54 as a supplemental heat source. An example of a predetermined condition is if a heater core inlet coolant fluid temperature is greater than a predetermined temperature. If the predetermined condition is satisfied, the methodology advances to block 775 and opens a valve 68 operatively connected to the exhaust heat recovery system to supply heated coolant fluid, such as to the heater core 48. Simultaneously, another valve 37 is closed so that hot exhaust gas does not bypass the heat exchanger 54. The methodology advances to diamond 780, to be described. Returning to diamond 770, if the predetermined condition is not satisfied to supply heated coolant fluid from the exhaust heat recovery system, the methodology advances to diamond 780, to be described.

Returning to diamond 780, the methodology determines if another supplemental heat source is required. For example, another supplement heat source may be necessary if the heater core coolant fluid inlet temperature of this example is less than a predetermined temperature. If another supplemental heat source is required, the methodology returns to block 715 and continues. If another supplemental heat source is not required, the methodology advances to bubble 785 and returns to block 105 in FIG. 3A.

Returning to block 105 in FIG. 3A, if the thermal management function is complete, the methodology advances to bubble 800 and ends.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of thermal management for a thermal management system in a vehicle comprising the steps of:
providing a plurality of thermal management functions comprising a group of recharge heat storage battery, engine cooling, battery power, battery cooling, climate control heating, coolant pump, and climate control;
selecting the thermal management functions in an order of recharge heat storage battery, engine cooling, battery power, battery cooling, climate control heating, coolant pump, and climate control;
adjusting a temperature by the thermal management system using the thermal management functions; and
using the adjusted temperature by the thermal management system to control a temperature within an occupant compartment of the vehicle.

2. A method as set forth in claim 1 wherein said step of selecting the thermal management function includes the steps of determining if a predetermined condition is right to recharge a heat storage battery and recharging a heat storage battery if the predetermined condition is right.

3. A method as set forth in claim 2 wherein said step of selecting the thermal management function includes the steps of determining if a predetermined condition is right to cool an engine and cooling the engine if the predetermined condition is right.

4. A method as set forth in claim 3 wherein aid step of selecting the thermal management function includes the steps of determining if an electrical power storage battery voltage is less than a predetermined voltage and adjusting the power requirements within the thermal management system if the electrical power storage battery voltage is less than a predetermined voltage.

5. A method as set forth in claim 4 wherein said step of selecting the thermal management function includes the steps of determining if a predetermined condition is right to cool an electrical power storage battery and cooling the electrical power storage battery if the predetermined condition is right.

6. A method as set forth in claim 5 wherein said step of selecting the thermal management function includes the steps of determining if a predetermined condition is right for a cooling pump within the thermal management system to operate and operating the coolant pump if the predetermined condition is right.

7. A method as set forth in claim 6 wherein said step of selecting the thermal management function includes the steps of:
   determining if a predetermined condition is right to use supplemental heating by the thermal management system;
   selecting a supplemental heat source if the predetermined condition is right to use supplemental heating;
   determining if a predetermined condition is right to use the selected supplemental heat source; and
   adjusting a temperature by the thermal management system using the supplemental heat source if a predetermined condition is right to use the selected supplemental heat source.

8. A method as set forth in claim 7 wherein the supplemental heat source is a heat storage battery.

9. A method as set forth in claim 8 wherein the supplemental heat source is an exhaust heat recovery system.

10. A method of thermal management for a thermal management system in a vehicle comprising the steps of:
    providing a plurality of thermal management functions comprising a group of recharge heat storage battery, engine cooling, battery power, battery cooling, climate control heating, coolant pump, and climate control;
    selecting the thermal management functions in a predetermined order to control a temperature by the thermal management system;
    using the thermal management functions to control the temperature by the thermal management system;
    determining if a predetermined condition is right to use supplemental heating by the thermal management system;
    selecting a supplemental heat source if the predetermined condition is right to use supplemental heating;
    determining if a predetermined condition is right to use the selected supplemental heat source;
    adjusting a temperature by the thermal management system using the supplemental heat source if a predetermined condition is right to use the selected supplemental heat source; and
    using the adjusted temperature by the thermal management system to control a temperature within an occupant compartment of the vehicle.

11. A method as set forth in claim 10 wherein said step of selecting the thermal management function includes the steps of determining if a predetermined condition is right to recharge a heat storage battery and recharging a heat storage battery if the predetermined condition is right.

12. A method as set forth in claim 11 wherein said step of selecting the thermal management function includes the steps of determining if a predetermined condition is right to cool an engine and cooling the engine if the predetermined condition is right.

13. A method as set forth in claim 12 wherein said step of selecting the thermal management function includes the steps of determining if an electrical power storage battery voltage is less than a predetermined voltage and adjusting the power requirements within the thermal management system if the electrical power storage battery voltage is less than a predetermined voltage.

14. A method as set forth in claim 13 wherein said step of selecting the thermal management function includes the steps of determining if a predetermined condition is right to cool an electrical power storage battery and cooling the electrical power storage battery if the predetermined condition is right.

15. A method as set forth in claim 14 wherein said step of selecting the thermal management function includes the steps of determining if a predetermined condition is right for a cooling pump within the thermal management system to operate and operating the coolant pump if the predetermined condition is right.

16. A method as set forth in claim 10 wherein the supplemental heat source is a heat storage battery.

17. A method as set forth in claim 10 wherein the supplemental heat source is an exhaust heat recovery system.

18. A method of thermal management for a thermal management system in a hybrid vehicle comprising the steps of:
    providing a plurality of thermal management functions comprising a group of recharge heat storage battery, engine cooling, battery power, battery cooling, climate control heating, coolant pump, and climate control;
    selecting the thermal management functions in an order of recharge heat storage battery, engine cooling, battery power, battery cooling, climate control heating, coolant pump, and climate control;
    determining if a predetermined condition to recharge a heat storage battery is right and recharging a heat storage battery if the predetermined condition to recharge the heat storage battery is right;
    determining if a predetermined condition to cool an engine is right and cooling the engine if the predetermined condition to cool the engine is right;
    determining if a predetermined condition to cool an electrical power storage battery is right and cooling the electrical power storage battery if the predetermined condition to cool the electrical power storage battery is right;
    determining if a predetermined condition to operate a cooling pump within the thermal management system is right and operating the coolant pump if the predetermined condition to operate the cooling pump is right;
    determining if a predetermined condition to use supplemental heating by the thermal management system is right;
    selecting a supplemental heat source if the predetermined condition to use supplemental heating is right;
    determining if a predetermined condition is right to use the selected supplemental heat source;
    adjusting a temperature by the thermal management system using the supplemental heat source if a condition is right to use the selected supplemental heat source; and
    using the adjusted temperature by the thermal management system to control a temperature within an occupant compartment of the vehicle.

19. A method as set forth in claim 18 wherein said step of selecting the thermal management function includes the steps of:

determining if an electrical power storage battery voltage is less than a predetermined voltage and adjusting the power requirements within the thermal management system if the electrical power storage battery voltage is less than a predetermined voltage.

20. A method as set forth in claim 18 wherein said supplemental heat source is a supplemental heat generating mechanism.

* * * * *